United States Patent
Dolgin et al.

(10) Patent No.: US 10,313,022 B2
(45) Date of Patent: Jun. 4, 2019

(54) ACTIVE DEMODULATION SYSTEMS AND METHODS FOR OPTICAL SIGNALS

(71) Applicant: RAYTHEON COMPANY, Waltham, MA (US)

(72) Inventors: Benjamin P. Dolgin, Alexandria, VA (US); Gary M. Graceffo, Burke, VA (US); Andrew Kowalevicz, Arlington, VA (US)

(73) Assignee: RAYTHEON COMPANY, Waltham, MA (US)

( * ) Notice: Subject to any disclaimer, the term of this patent is extended or adjusted under 35 U.S.C. 154(b) by 44 days.

(21) Appl. No.: 15/717,670

(22) Filed: Sep. 27, 2017

(65) Prior Publication Data

US 2018/0091232 A1 Mar. 29, 2018

Related U.S. Application Data

(60) Provisional application No. 62/400,350, filed on Sep. 27, 2016.

(51) Int. Cl.
*H01S 3/08* (2006.01)
*H01S 3/10* (2006.01)
(Continued)

(52) U.S. Cl.
CPC ....... *H04B 10/672* (2013.01); *H01S 3/08031* (2013.01); *H01S 3/10092* (2013.01);
(Continued)

(58) Field of Classification Search
CPC ............. H04B 10/672; H04B 10/676; H04B 2210/516; H01S 3/10092; H01S 3/08031;
(Continued)

(56) References Cited

U.S. PATENT DOCUMENTS

| 8,111,402 B2 | 2/2012 | Le et al. |
| 8,411,351 B2 | 4/2013 | McCallion et al. |

(Continued)

FOREIGN PATENT DOCUMENTS

JP   H0591047 A   4/1993

OTHER PUBLICATIONS

Ehteshami et al, Optically tunable single passband microwave photonic filter based on phase-modulation to intensity-modulation conversion in a silicon-on-insulator microring resonator (published in International Topical Meeting of Microwave Photonics, Oct. 2015).*

(Continued)

*Primary Examiner* — Casey L Kretzer
(74) *Attorney, Agent, or Firm* — Lando & Anastasi, LLP

(57) ABSTRACT

Aspects are generally directed to receivers and methods for actively demodulating optical signals. In one example, a receiver includes an optical resonator to receive an optical signal, the optical resonator including an active optical medium interposed between first and second semi-reflective surfaces, where the active optical medium is configured to accumulate resonant optical signal energy inside the optical resonator based on the received optical signal, the second semi-reflective surface is positioned to emit output optical signal energy, and the optical resonator is configured to disturb the output optical signal energy in response to a variation in the received optical signal. The receiver may further include a detector configured to detect the disturbance in the output optical signal energy, and a pump source coupled to the active optical medium to excite the active optical medium to generate an optical gain in the received optical signal.

19 Claims, 9 Drawing Sheets

(51) Int. Cl.
*H01S 3/094* (2006.01)
*H04B 10/67* (2013.01)

(52) U.S. Cl.
CPC ............. *H04B 10/676* (2013.01); *H01S 3/08* (2013.01); *H01S 3/094076* (2013.01); *H01S 3/10053* (2013.01); *H04B 2210/516* (2013.01)

(58) Field of Classification Search
CPC ... H01S 3/10053; H01S 3/08; H01S 3/094076
See application file for complete search history.

(56) References Cited

U.S. PATENT DOCUMENTS

| | | | |
|---|---|---|---|
| 8,693,875 B2 | 4/2014 | Banwell et al. | |
| 2006/0013591 A1 | 1/2006 | Rohde | |
| 2007/0031150 A1 | 2/2007 | Fisher et al. | |
| 2008/0034866 A1 | 2/2008 | Kilic et al. | |
| 2008/0074736 A1* | 3/2008 | Kuo | H04B 10/2916 359/341.3 |
| 2008/0226300 A1 | 9/2008 | Mayer et al. | |
| 2008/0240736 A1 | 10/2008 | Ji et al. | |
| 2008/0266573 A1 | 10/2008 | Choi et al. | |
| 2011/0097085 A1 | 4/2011 | Oda et al. | |
| 2012/0121271 A1 | 5/2012 | Wood | |
| 2012/0269523 A1 | 10/2012 | McCallion et al. | |
| 2013/0272337 A1 | 10/2013 | Tan et al. | |
| 2013/0327145 A1 | 12/2013 | Walker et al. | |
| 2014/0314406 A1 | 10/2014 | Zerbe et al. | |
| 2015/0160257 A1 | 6/2015 | Bulatowicz | |
| 2016/0013870 A1 | 1/2016 | Sorin et al. | |
| 2018/0054259 A1 | 2/2018 | Kowalevicz et al. | |
| 2018/0091227 A1 | 3/2018 | Dolgin et al. | |
| 2018/0091228 A1 | 3/2018 | Kowalevicz et al. | |
| 2018/0091230 A1 | 3/2018 | Dolgin et al. | |

OTHER PUBLICATIONS

Arimoto et al., "High-speed free-space laser communication", Performance and Management of Complex Communications Networks, 1998, pp. 175-190.

Wright et al., "Adaptive optics correction into single mode fiber for a low Earth orbiting space to ground optical communication link using the OPALs downlink", Optics Express, vol. 23, Dec. 2015, pp. 1-8.

Andrews et al., "Final Report: Channel Characterization for Free-Space Optical Communications, Phase 0 testing at Hollister, CA, Phase 2 Final Testing at China Lake, CA", Jul. 2012, pp. 1-60. Retrieved from <URL: http://www.dtic.mil/cgi-bin/GetTRDoc?Location=U2&doc=GetTRDoc.pdf&AD=AD565323> and accessed on Nov. 17, 2017.

Juarez et al., "High-sensitivity DPSK receiver for high-bandwidth free-space optical communication links", Optics Express, vol. 19, May 2011, pp. 1-8.

Zhang, L. et al. "Microring-based Modulation and Demodulation of DPSK Signal" Optical Society of America, Optics Express, vol. 15, No. 18, Sep. 3, 2007.

Fang et al., "Multi-channel Silicon Photonic Receiver Based on Ring-resonators", Optics Express, vol. 18, No. 13, pp. 13510-13515, Jun. 21, 2010.

Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

* cited by examiner

ACTIVE DEMODULATION SYSTEMS AND METHODS FOR OPTICAL SIGNALS

CROSS REFERENCE TO RELATED APPLICATION

This application claims priority under 35 U.S.C. § 119(e) to U.S. Provisional Application Ser. No. 62/400,350, titled "SYSTEMS AND METHODS FOR ACTIVE DEMODULATION OF OPTICAL COMMUNICATION SIGNALS," filed on Sep. 27, 2016, which is hereby incorporated herein by reference in its entirety.

BACKGROUND

Many optical communication systems manipulate light waves to carry information. For instance, often a light source (e.g., a laser source) is modulated to change various properties of emitted light, such as an amplitude, phase, frequency, or wavelength of the light to convey information. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, from which the underlying signal and the information may be recovered.

Optical signals with phase modulation formats have several advantages over amplitude modulation formats. However, when compared to typical amplitude modulation receivers, phase modulation receivers can be significantly more complex. Some examples of phase modulation receivers may include local oscillators, Fiber Bragg Gratings (FBG), and delay line interferometers (DLI). Generally, a phase modulation receiver collects a phase-encoded optical signal and performs one or more demodulation processes to convert the phase modulation into useful information. For example, this information may include communication information encoded in the phase modulation by a transmitter, information encoded in the phase modulation through interaction of the optical signal with an object, or other information about the source of the optical signal, the optical channel through which it traveled, and/or objects with which it interacted.

SUMMARY

Aspects and examples described herein provide systems and methods for demodulation of weak optical signals without a locally coherent clock source. In particular, certain examples of the systems described herein include an optical signal receiver that includes an optical resonator having a controllable active optical medium. The optical resonator is configured to generate an optical gain in a received optical signal (e.g., a phase-encoded optical signal), and convert the received optical signal into an intensity-encoded optical signal. Examples of the described systems may detect information encoded in the optical signal based on the intensity-encoded optical signal. When compared to various known receivers, the described systems and methods increase the detectability of phase transitions in a received optical signal, among various other benefits. Moreover, the examples of the systems and methods may be tuned to the wavelength of an optical carrier signal and therefore function over a broad range of modulation rates without the need to modify the characteristics of the receiver. That is, the systems and methods disclosed herein may provide the flexibility to accommodate various encoding techniques.

According to an aspect, provided is an optical signal receiver. In one example, the optical signal receiver comprises an optical resonator including a first semi-reflective surface positioned to receive an optical signal, a second semi-reflective surface positioned facing the first semi-reflective surface, and an active optical medium interposed between the first semi-reflective surface and the second semi-reflective surface, the active optical medium being configured to accumulate resonant optical signal energy inside the optical resonator and between the first semi-reflective surface and the second semi-reflective surface based at least in part on the received optical signal, the second semi-reflective surface being positioned to emit output optical signal energy, where the optical resonator is configured to disturb the output optical signal energy in response to a variation in the received optical signal. The optical signal receiver may further include a detector configured to detect the disturbance in the output optical signal energy, and a pump source coupled to the active optical medium and configured to excite the active optical medium to generate an optical gain in the received optical signal.

According to another aspect, provided is a method of operating an optical signal receiver. In one example, the method comprises receiving an optical signal at a first semi-reflective surface of an optical resonator, accumulating resonant optical signal energy at an active optical medium interposed between the first semi-reflective surface and a second semi-reflective surface of the optical resonator, the second semi-reflective surface positioned facing the first semi-reflective surface, exciting the active optical medium to generate an optical gain in the received optical signal, emitting output optical signal energy from the second semi-reflective surface, an intensity of the output optical signal energy being based at least in part on an intensity of the accumulated resonant optical signal energy, disturbing the intensity of the output optical signal energy in response to a variation in the received optical signal, and detecting the disturbance in the intensity of the output optical signal energy.

According to an aspect, provided is an optical signal receiver. In one example, the optical signal receiver comprises an optical resonator configured to receive an optical signal, the optical resonator including an active optical medium configured to accumulate resonant optical signal energy inside the optical resonator based at least in part on the received optical signal, and the optical resonator being further configured to emit output optical signal energy, where the optical resonator is configured to disturb the output optical signal energy in response to variation in the received optical signal, a detector configured to detect the disturbance in the output optical signal energy, and a pump source coupled to the active optical medium and configured to excite the active optical medium to generate an optical gain in the received optical signal.

In various examples, the pump source is an optical source optically coupled to the active optical medium and configured to direct a pump beam at the active optical medium. In certain examples, the output optical signal energy is a convolution of the pump beam and an emitted portion of the accumulated resonant optical signal energy. According to various examples, the pump beam is a pulsed pump beam. In some examples, the pump beam is a continuous pump beam. According to various examples, the active optical medium has an absorption band, the pump beam having a wavelength tuned to the absorption band of the active optical medium.

According to various examples, the optical resonator is configured to disturb the output optical signal energy in response to a variation in a phase of the received optical signal. In various examples, the disturbance in the output optical signal energy is a variation in an intensity of the output optical signal energy, the detector being configured to identify the variation in the phase of the received optical signal based at least in part on the variation in the intensity of the output optical signal energy. According to some examples, the pump source is configured to direct a pulsed pump beam at the active optical medium, the pulsed pump beam being synchronized with the received optical signal such that the variation in the intensity of the output optical signal energy occurs coincident with a pulse of the pulsed pump beam.

In various examples, the pump source is an electrical power source coupled to the active optical medium and configured to electrically excite the active optical medium. In certain examples, the optical resonator further includes a first semi-reflective surface positioned to receive the optical signal, and a second semi-reflective surface positioned facing the first semi-reflective surface and arranged to emit the output optical signal energy, where the active optical medium is interposed between the first semi-reflective surface and the second semi-reflective surface. In at least a few examples, the optical resonator is further configured to accumulate the resonant optical signal energy inside the optical resonator and between the first semi-reflective surface and the second semi-reflective surface to approach a steady-state output value of the output optical signal energy, the disturbance in the output optical signal energy being a deviation from the steady-state output value.

According to another aspect, provided is a method of operating an optical signal receiver. In one example, the method includes receiving an optical signal at an optical resonator, the optical resonator including an active optical medium, exciting the active optical medium to generate an optical gain in the received optical signal, accumulating resonant optical signal energy in the active optical medium based at least in part on the received optical signal, emitting output optical signal energy from the optical resonator, an intensity of the output optical signal energy being based at least in part on an intensity of the accumulated resonant optical signal energy, disturbing the intensity of the output optical signal energy in response to a variation in the received optical signal, and detecting the disturbance in the intensity of the output optical signal energy.

In various examples, exciting the active optical medium includes generating a pump beam at an optical pump source and directing the pump beam at the active optical medium. According to some examples, the output optical signal energy is a convolution of the pump beam and an emitted portion of the accumulated resonant optical signal energy. In at least one example, the pump beam is a pulsed pump beam. In other examples, the pump beam is a continuous pump beam.

According to various examples, disturbing the intensity of the output optical signal energy includes disturbing the intensity of the output optical signal energy in response to a variation in a phase of the received optical signal. In some examples, the method further comprises identifying the variation in the phase of the received optical signal based at least in part on the disturbance in the intensity of the output optical signal energy. In various examples, exciting the active optical medium includes directing a pulsed pump beam at the active optical medium, the pulsed pump beam being synchronized with the received optical signal such that the disturbance in the intensity of the output optical signal energy occurs coincident with a pulse of the pulsed pump beam. In at least a few examples, exciting the active optical medium includes generating a voltage or current at an electrical power source, and directing the voltage or current to the active optical medium.

Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
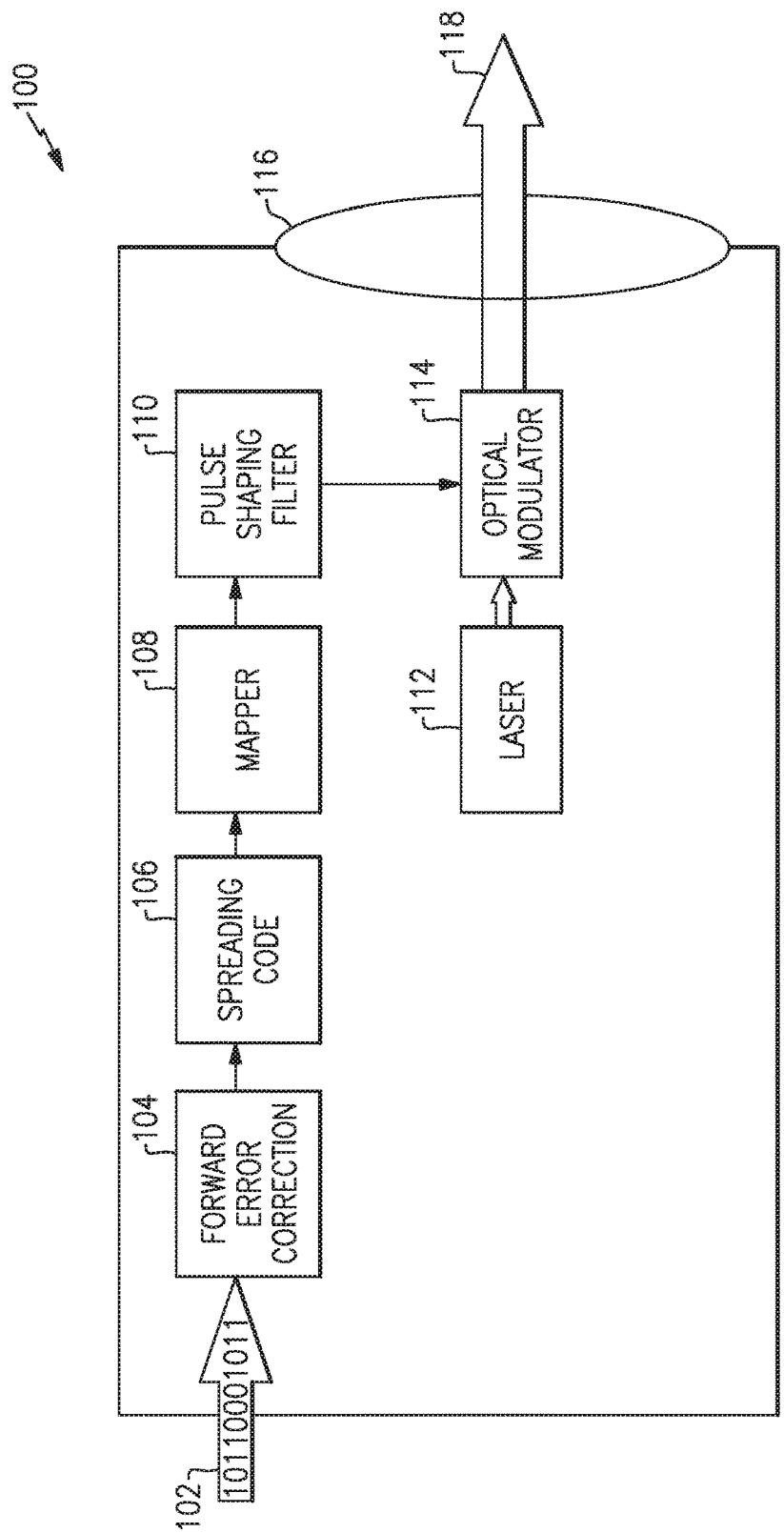
FIG. 1 is a block diagram of an optical transmitter for use with various examples described herein.

Aspects and examples described herein provide systems and methods for demodulation of phase-encoded (i.e., phase modulated) optical signals without a locally coherent clock source. In certain examples, the system includes an optical resonator, such as a Fabry-Perot filter/resonator, for converting a phase-encoded optical signal into an intensity-encoded optical signal. The intensity-encoded optical signal may be used to detect information encoded in the phase-encoded optical signal. As further described herein, examples of the optical resonator include an active optical medium that is excited by a pump source to generate an optical gain in the received phase-encoded optical signal. The optical gain improves the detectability of the phase-encoded optical signal, as well as, one or more variations (e.g., phase transitions) in the phase-encoded optical signal.

Phase encoded optical signals may come from numerous sources and/or be generated by numerous processes. Detection of a phase encoding may therefore be useful for many purposes. For instance, a coherent optical signal, such as a laser beam, may be modulated by a data communications transmitter to encode communicated information on an optical signal. However, other types of information, such as timing and/or time stamp information, may also be encoded as a phase modulation. Various processes phase modulate a coherent light source, and, accordingly, information about the process may be recovered by appropriate demodulation (e.g., interpreting) of the phase modulated optical signal. For example, various measurement systems may transmit an optical signal and analyze a reflected signal to determine dimensions, movement, defects, etc.

Some examples of typical phase modulation receivers include local oscillators, Fiber Bragg Gratings, and delay line interferometers. Each of these receivers has significant drawbacks. In particular, these systems typically require components that are complex, large, and/or costly, and often have significant functional limitations. For example, many conventional approaches include a laser positioned within the receiver to convert a phase modulation to an amplitude modulation. However, these techniques require a highly stable laser having a narrow-line width. Another typical approach uses a FBG to convert the phase modulation to amplitude modulation, which requires an optical circulator element, thereby increasing the complexity, size, and cost. A further conventional approach uses a Mach-Zehnder delay line interferometer and is limited to a single communication data rate.

Examples of various systems for which demodulation of phase modulated optical signals may be beneficial include target designators, laser guidance systems, laser sight, laser scanners, 3D scanners, homing beacons and/or surveying systems, as well as communication systems. In at least some of these examples, an optical signal may arrive via a free space signal path (e.g., free space optical, FSO), a fiber coupling, or another waveguide system. Systems and method for demodulation of phase modulated optical signals in accord with aspects and examples disclosed herein may be beneficially applied to any of the above example optical systems, or others, to receive, detect, recover, etc. useful information from an optical signal having phase encoding.

It is to be appreciated that embodiments of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics, to name a few examples.

Many optical receivers (e.g., coherent receivers) require a stable clock in order to accurately perform demodulation processes for a received signal, and may also require sophisticated optics such as 90-degree hybrids, phase shifters, and the like, especially when modulation includes encoding of information in polarization of the optical signal. In contrast, optical receivers (also referred to as "optical signal receivers") in accord with the aspects and examples disclosed herein do not require a local coherent clock source and do not require significant optical components to achieve the same receiver capabilities as a conventional optical receiver. The benefits are achieved, at least in part, by an optical front-end that includes an optical resonator capable of detecting modulation transitions, such as phase variations, in a received optical signal without a coherent reference source. The optical resonator further transforms the modulation, e.g., phase modulation, into an intensity modulation that allows simplified processing, potentially in the electrical domain.

Figure 2:
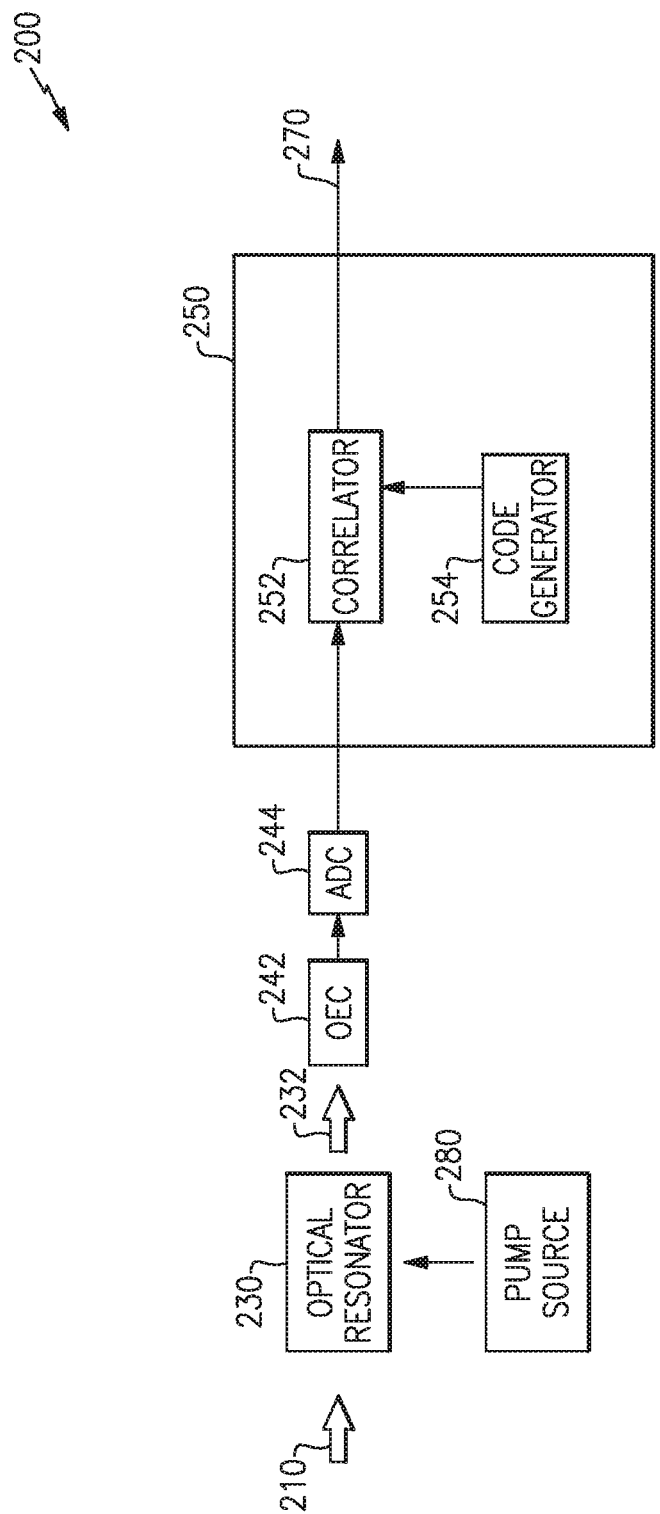
FIG. 2 is a block diagram of an optical receiver according to various examples described herein.

A functional block diagram of one example of a transmitter (e.g., optical transmitter 100) is illustrated in FIG. 1, and a functional block diagram of one example of a receiver (e.g., optical signal receiver 200) is illustrated in FIG. 2. The transmitter illustrated in FIG. 1 may be combined with the receiver illustrated in FIG. 2 to provide one example of a communication assembly, as will be readily apparent to one of ordinary skill in the art given the benefit of this disclosure.

Though the components of the example optical transmitter 100 (also referred to herein as "optical signal transmitter" 100) shown in FIG. 1 and the optical receiver 200 (also referred to herein as "optical signal receiver" 200) shown in FIG. 2 may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., predefined routines). In particular, the software instructions may include digital signal processing (DSP) instructions. Unless otherwise indicated, signal lines between components of the optical transmitter 100 and components of the optical receiver 200 may be implemented as discrete analog, digital, or optical signal lines. Some of the processing operations may be expressed in terms of calculations or determinations by the optical transmitter 100, the optical receiver 200, a detector, a controller, or other components. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 1, one example of an optical transmitter 100 may include an input 102 to receive a data payload, a forward error correction (FEC) module 104, a spreading module 106, a mapping module 108, a pulse-shaping filter 110, an optical source (e.g., a laser) 112, a modulator 114, one or more optics 116, and an output 118 to provide an optical signal output. In the optical transmitter 100, the FEC module 104 implements forward error correction by adding redundancy to the received data payload with a block code or convolution code. For example, the FEC module 104 may repeat one or more bits within the data payload to reduce an effect that the transmission medium may have on the transmitted signal waveform. Accordingly, in various examples the optical transmitter 100 may include a FEC module 104 to control errors that may result from transmitting the data payload through a noisy or lossy medium. Following the FEC module 104, the data payload is provided to the spreading module 106.

The transmitter 100 includes a spreading module 106 that applies a spreading code to the data payload. The spreading code is useful for identifying and processing signal components in the receiver, and may reduce the effects of intersymbol interference (ISI). For example, the spreading module 106 may include a pseudo-random code generator (PRCG) and may apply direct sequence spread spectrum (DSSS) techniques, while other examples of transmitters or spreading modules may apply other forms of spreading. The mapping module 108 receives the data payload from the spreading module 106 and maps the data payload to a particular modulation scheme. For instance, the mapping module 108 may map the data payload to various positions of a particular phase and amplitude constellation, depending upon the types of modulation used by the transmitter, e.g., phase, amplitude, frequency, or any combination of these.

A pulse-shaping filter 110 may receive an output of the mapping module 108 and control the modulator 114 to impose the modulation scheme on the optical source 112 to generate a modulated optical signal. In various examples, the modulator 114 may be an electro-optic modulator, and may include the optical source 112, such as a laser. In particular, the optical source 112 may emit a continuous carrier waveform that is modulated (e.g., in phase, amplitude, and/or frequency) for each symbol of the data payload to encode those symbols on the carrier waveform. The transmitter 100 may also include one or more optics 116, such as one or more mirrors or lenses, which direct the optical signal at the output 118. Specifically, the one or more optics 116 may be used to direct the optical signal in a direction of an optical receiver (e.g., the optical receiver 200 illustrated in FIG. 2).

Referring to FIG. 2, illustrated is an example of an optical receiver 200 according to various examples discussed herein. FIG. 2 is described with continuing reference to the optical transmitter 100 of FIG. 1, which may communicate data payloads to the optical receiver 200. For instance, the optical receiver 200 may receive an optical signal transmitted along a free space signal path (e.g., free space optical, FSO), a fiber coupling, or another waveguide system by the optical transmitter 100 of FIG. 1. In various examples, the optical receiver 200 may be paired together with the optical transmitter 100 to form a bidirectional data communication system (e.g., a transceiver). The transceiver may be capable of bidirectional data communication with another transmitter/receiver pair.

As illustrated in FIG. 2, the optical receiver includes an optical resonator 230, an optical-electrical converter (OEC) 242, an analog to digital converter 244, a pump source 280, and a digital processing subsystem 250. As discussed herein, the OEC 242, analog to digital converter 244, and digital processing subsystem 250 may be collectively referred to as a detector. However, in various other examples, the OEC 242, analog to digital converter 244, and digital processing subsystem 250 may be separate components.

The optical resonator 230 is positioned to receive an optical signal 210. The optical resonator 230 may be coupled to the digital processing subsystem 250 by the OEC 242 and the analog to digital converter 244, for example. The digital processing subsystem 250 is configured to provide an output 270 to one or more downstream components based on the received optical signal 210 and/or one or more characteristics of the received optical signal 210.

Examples of optical resonators 230 may include Fabry-Perot etalons, micro-rings, or other types of resonators. The optical resonator 230 is a component capable of sensing variations, such as phase variations, in the received optical signal 210. In various examples, the optical resonator 230 is coupled to the pump source 280, which may excite one or more components (e.g., an active optical medium) of the optical resonator 230 to generate an optical gain in the received optical signal 210. The variations in the received optical signal 210 are representative of a modulation performed at the transmitter. That is, the one or more variations may be representative of information encoded on the optical signal 210. As further described below with reference to at least FIG. 3 the optical resonator 230 transforms the variations into an intensity modulation of output optical signal energy (e.g., shown as output optical signal energy 232 in FIG. 2). In particular, the optical resonator 230 converts a modulation of the received optical signal 210 in part by interaction of the arriving optical signal 210 with resonant optical signal energy accumulated within the optical resonator 230.

In various examples, the optical resonator 230 is an etalon. That is, the optical resonator 230 may include a pair of parallel semi-reflective surfaces with an at least semi-transparent medium interposed there between. As described, in some examples the semi-transparent medium is an active optical medium that provides an optical gain (e.g., amplitude increase) when excited by an optical or electrical signal. Examples and details of the active optical medium are further described below with reference to FIG. 3. The optical resonator 230 may have one or more characteristic resonant frequencies, each associated with a certain wavelength of light, based upon the spacing (i.e., dimensional length) between the semi-reflective surfaces. In some examples, the surfaces are semi-reflective and also semi-transmissive, in that they allow some light through. Accordingly, the arriving optical signal 210 may be allowed into the optical resonator 230 (i.e., between the pair of semi-reflective surfaces) and may resonate inside the optical resonator 230 and between the pair of semi-reflective surfaces. Additionally, some of the resonating optical signal energy inside the optical resonator 230 is emitted out of the optical resonator 230 through one of the semi-transmissive surfaces (referred to as the "output optical signal energy"). The output optical signal energy emitted from the optical resonator is shown, for example, as the optical signal energy 232 in FIG. 2.

The optical signal 210 received by the optical resonator 230, an etalon in this example, may establish a steady-state energy-preserving condition in which optical signal 210 continuously arrives at the optical resonator 230, accumulates or adds to build-up resonating optical signal energy inside the optical resonator 230, and emerges from the optical resonator 230 at a constant rate (i.e., a steady-state output value). A variation in the arriving phase, frequency, or amplitude of the optical signal 210 may disrupt the optical signal energy resonating inside the optical resonator 230, and, accordingly, disturb the output optical signal energy 232. Once the steady state condition is re-established (i.e., the optical signal 210 arrives at a constant rate without a variation), the output optical signal energy 232 returns to the corresponding constant rate.

Accordingly, a change in phase, frequency, or amplitude of the arriving optical signal 210 causes a change in intensity of the emerging output optical signal energy 232. A large phase transition in the arriving optical signal 210, for example, causes a large (but temporary) intensity change in the emerging output optical signal energy 232. Similar operation occurs in a micro-ring or other optical resonator. Accordingly, in various examples, the optical resonator 230 functions as a demodulator, or a modulation converter, for a received optical signal (e.g., optical signal 210). The emerging output optical signal energy 232 may therefore carry the same information content as the arriving optical signal 210, but in intensity modulated form.

In various examples, the output optical signal energy 232 is directed to the OEC 242. The OEC 242 converts the emerging intensity-modulated output optical signal energy 232 into an electrical signal. For example, the OEC 242 may include a photodetector, such as a photodiode. Accordingly, the OEC 242 may produce an amplitude modulated signal representative of the intensity-modulated output optical signal energy 232. The amplitude modulated signal representative of the intensity-modulated output optical signal energy 232 may be converted to a digital form by the analog to digital converter 244. The digital signal is provided to the digital processing subsystem 250 for digital processing. The digital processing subsystem 250 processes the digital signal to receive the information-carrying content of the optical signal 210. The basic operation of the digital processing subsystem 250 is known in the art, and may include, e.g., a correlator 252 and a code generator 254, but the details of any particular implementation may vary.

In various examples, a receiver in accord with aspects and examples disclosed herein may include additional or fewer optics than discussed above, and may omit or add various components relative to those discussed above. For example, focusing optics may be included to receive the emerging output optical signal energy 232 from the optical resonator 230 and to focus the output optical signal energy 232 on the OEC 242. In certain examples, the receiver 200 may also include one or more optics (now shown) that collect and direct the optical signal 210 to the optical resonator 230. Certain examples of the receivers described herein may also use analog receiver circuitry and therefore may omit one or more of the ADCs 224. Various examples may include a channel estimator as part of the digital processing subsystem 250 to provide phase rotation or other signal adjustments as may be known in the art.

As discussed above, suitable optical resonators may include etalons, micro-rings, or other structures. Some detail of at least one example of an etalon is discussed below with respect to FIG. 3. A micro-ring is a resonator formed of one or more waveguides in which at least one is a closed loop such that optical signal energy traversing "around" the loop may be phase aligned with a dimension of the loop at one or more frequencies. Accordingly, optical signal energy traversing the loop may constructively interfere with itself, at certain frequencies, to sustain the optical signal energy within the loop. At other frequencies, optical signal energy traversing the loop will destructively interfere with itself thereby destroying, or rejecting, a build-up of optical signal energy at that frequency. The closed loop is also coupled to some type of input and output, to allow light to enter the loop, e.g., an aperture, and to let light out of the loop. An active optical medium may be used in a micro-ring resonator in a manner similar to that described below with reference to an etalon. Accordingly, examples of the active optical medium described herein are not so limited to the arrangement illustrated in FIG. 3.

The use of the term "etalon" throughout this disclosure is not intended to be limiting and as used herein may include any of multiple structures, including plates with reflecting surfaces as well as parallel mirrors with various materials positioned in-between, and in particular examples, with active optical materials positioned in-between. The spacing between the first semi-reflective surface and the second semi-reflective surface of the optical resonator (e.g., optical resonator 230 shown in FIG. 2 or optical resonator 300 shown in FIG. 3) may be referred to herein as a cavity, but is not so limited. That is the optical resonators may include other structures, such interferometers and the like. Additionally, etalon structures may be formed as a laminate, layer, film, coating, or the like.

In some examples, an optical resonator (e.g., an etalon) may include reflective surfaces (including semi-reflective surfaces) that are not co-planar and/or are not co-linear. For example, an interior reflective surface of an optical resonator may include some curvature, and an opposing surface may also be curved such that a distance between the two surfaces is substantially constant across various regions of the optical resonator, in some examples. In other examples, an optical resonator may have non-linear or non-planar surfaces with varying distances between the surfaces at various regions, and may still function as an optical resonator for various wavelengths and at various regions, suitable for use in examples discussed herein. Accordingly, an optical resonator may be purposefully designed to conform to a surface, or to have various regions responsive to differing wavelengths, or responsive to differing angles of arrival for a given wavelength, in certain examples.

Figure 3:
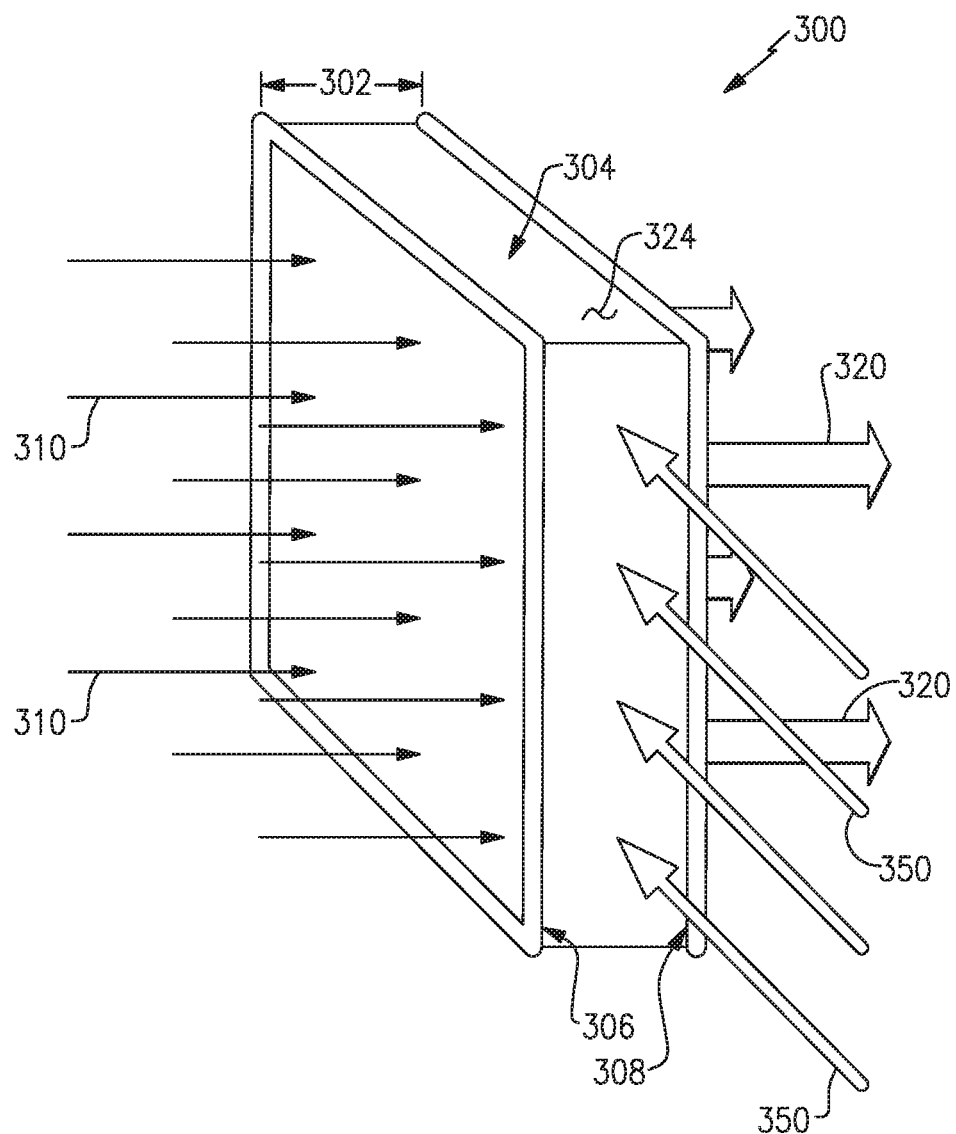
FIG. 3 illustrates an optical resonator according to various examples described herein.

FIG. 3 illustrates an example of an optical signal resonator 300, and in particular an etalon, which may be used in various examples of an optical receiver in accord with aspects and examples described herein. For instance, the optical resonator 300 may be used as the optical resonator 230 in FIG. 2. In various examples, the optical resonator 300 may be used to convert phase modulations of a received optical communication signal 310 ("optical signal" 310) into intensity or amplitude modulations of output optical signal energy 320. The intensity or amplitude modulated output optical signal energy 320 may then be converted to an electrical signal by an OEC (e.g., OEC 242 shown in FIG. 2), with corresponding amplitude variations representative of the phase modulation of the received optical signal 310. The optical resonator 300 causes the received optical signal 310 to resonantly interact with itself, internal to the optical resonator 300, such that phase changes in the received optical signal 310 disrupt the resonance of optical signal energy within the optical resonator 300 and cause amplitude (or intensity) variations in the output optical signal energy 320, which may be coupled directly to the OEC and other components of a detector.

In particular examples, the optical resonator 300 is designed to have a resonant frequency aligned with the source, e.g., a transmit laser, of the received optical communication signal 310. In various examples, a dimensional scale, e.g., length 302, of the optical resonator 300 is selected such that the optical resonator 300 exhibits optical resonance at the wavelength of the received optical communication signal 310. The effect of a pump source on the active optical medium of the optical resonator 300 may be taken into consideration when selecting the dimensional scale of the optical resonator 300. In certain examples, such dimensional scales are much shorter than the length of a transmitted symbol, which is the distance traveled by the optical signal 310 between transitions that convey information, e.g., between phase changes in a phase modulated signal.

As illustrated in FIG. 3, in various examples the optical resonator 300 may include an interior 304 (e.g., a cavity) that is defined by a first-semi reflective surface 306 and a second semi-reflective surface 308. The first semi-reflective surface 306 is positioned in optical communication with the second semi-reflective surface. In particular, in FIG. 3 the first semi-reflective surface 306 is positioned substantially parallel and facing the second semi-reflective surface 308. As illustrated in FIG. 3, in various examples each of the first and second semi-reflective surfaces 306, 308 are substantially planar. However, in other examples, other arrangements and surface curvatures may be used. The optical resonator 300 further includes an active optical medium 324 inside the optical resonator 300 and interposed between the first semi-reflective surface 306 and the second semi-reflective surface 308. Accordingly, the optical signal energy resonating between the first semi-reflective surface 306 and the second semi-reflective surface 308 propagates through the active optical medium 324. While shown in FIG. 3 as being composed of a single material, in certain other examples, the active optical medium 324 may include multiple layers of the same material or different materials.

In various examples, the first semi-reflective surface 306 and the second semi-reflective surface 308 may each also be semi-transmissive. Accordingly, one of the first semi-reflective surface 306 and the second semi-reflective surface 308 may form an entrance aperture (shown as the first semi-reflective surface 306 in FIG. 3) through which the arriving optical communication signal 310 is received and directed into the inside 304 of the optical resonator 300. The other of the first semi-reflective surface 306 and the second semi-reflective surface 308 (shown as second the semi-reflective surface 308 in FIG. 3) forms an optical output from which the output optical signal energy 320 is emitted. That is, the second semi-reflective surface 308 allows a portion of trapped resonating optical signal energy from the interior 304 to emerge as the output optical signal energy 320. Accordingly, the second semi-reflective surface 308 is also semi-transmissive, such that optical signal energy arriving (from the active optical medium 324) at the second semi-reflective surface 308 is partially reflected back to the interior 304 and partially transmitted through the output.

The optical resonator 300 may have varying levels of reflectivity and transitivity of the semi-reflective surfaces 306, 308. In certain examples, the reflectivity may be expressed as a fraction of light amplitude reflected back into the active optical medium 324 (e.g., in the interior 304 of the optical resonator 300), or may be expressed as a fraction of light intensity reflected back into the active optical medium 324 (e.g., into the interior 304 of the optical resonator 300). In a particular example, an amplitude reflectivity of the first semi-reflective surface 306 may be $r_1=0.999$ and an amplitude reflectivity of the second semi-reflective surface 308 may be $r_2=0.985$. In other examples the reflectivity of each of the first and second semi-reflective surfaces 306, 308 may be different, and may be any suitable value for a particular implementation. The optical resonator 300 is one example of a suitable optical resonator in accord with aspects and examples described herein.

As shown in FIG. 3, the optical resonator 300 may include the active optical medium 324 interposed between the first semi-reflective surface 306 and the second semi-reflective surface 308. Accordingly, the active optical medium 324 accumulates the resonant optical signal energy inside the optical resonator 300 and between the first semi-reflective surface 306 and the second semi-reflective surface 308. The active optical medium 324 may be coupled to a pump source that is configured to excite the active optical medium 324 to generate an optical gain in the received optical signal 310. That is, the active optical medium 324 may include one or more active material layers that, when excited, amplify the received optical signal 310, and accordingly, amplify the resonating optical signal energy inside the optical resonator 300 and amplify the output optical signal energy 320. FIG. 3 illustrates the active optical medium 324 receiving an optical pump beam 350 to excite the active optical medium 324. Although the optical pump beam 350 is illustrated incident on the active optical medium 324 at about an orthogonal angle (e.g., about 90 degrees), in other examples, the optical pump beam 350 may be directed to the active optical medium at other angles, in other orientations, or via a fiber coupling. As such, the arrangement shown in FIG. 3 is merely for the convenience of illustration.

While in one example, the active optical medium 324 may be excited by an optical pump source, such as a laser source, in other examples the active optical medium 324 may be responsive to other forms of excitation, such as an electrical current, an electrical voltage, or a mechanical excitation (e.g., displacement). Accordingly, in various examples, the active optical medium 324 may be controlled (e.g., excited) to improve receiving and demodulation operations for a weak optical signal.

In particular examples, the active optical medium 324 is a gain medium such as a crystal material, a glass material, or a semiconductor-based material. The particular active optical medium 324 may be selected based on the application of the optical resonator 300. For instance, the active optical medium 324 may include a doped glass or crystalline structure that has an absorption band and an emission band. In particular, the active optical medium 324 may be selected to have an emission band that encompasses a wavelength of the received optical signal 310. The pump beam 350 may then be selected to have a wavelength within the absorption band of the active optical medium 324. Accordingly, when directed at the active optical medium 324, the pump beam 350 is absorbed by the active optical medium and therefore causes an emission of energy within the emission band. Such an emission produces the optical gain. Conversely, when the pump beam 350 is not directed at the optical medium (e.g., no excitation is provided) no optical gain is provided. Accordingly, in some examples, the active optical medium 324 may be selectively and/or dynamically controlled to selectively provide and control an application of the optical gain.

Figure 4A:
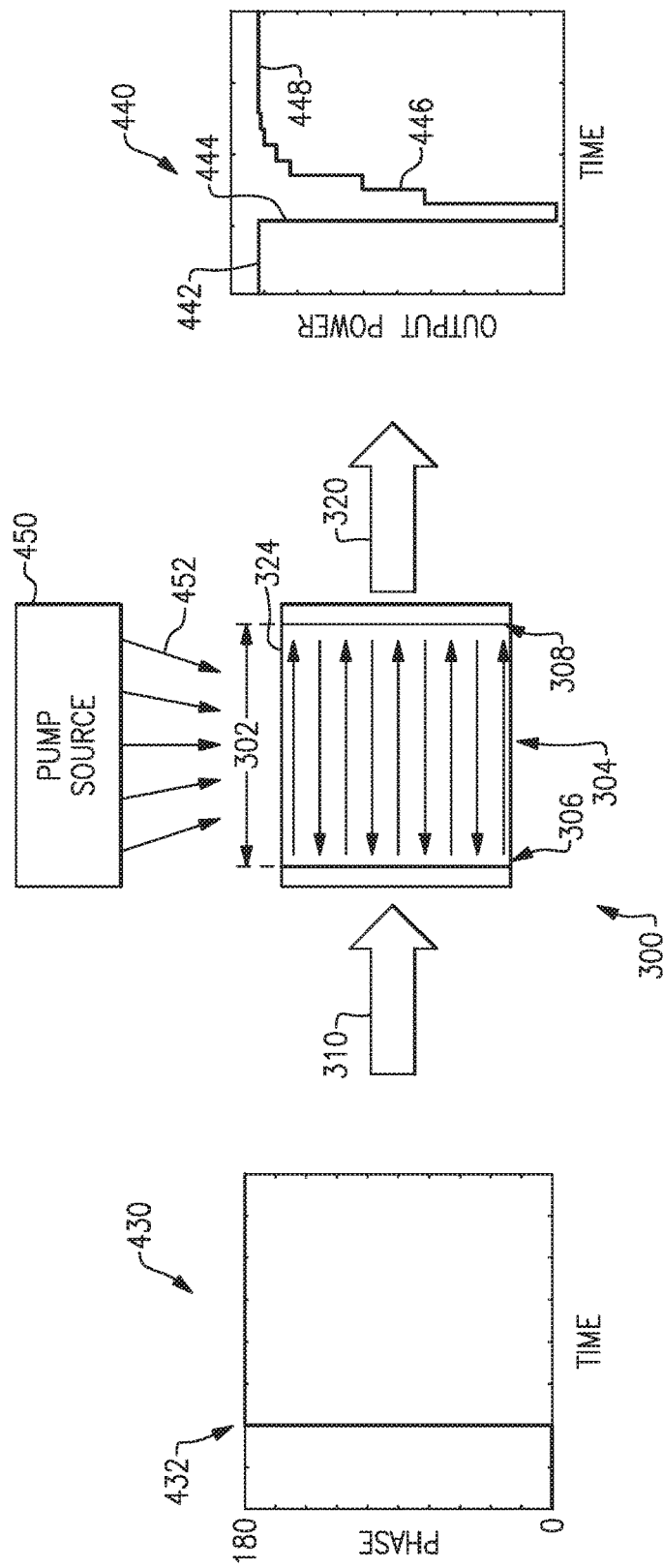
FIG. 4A is a schematic diagram of the optical resonator illustrated in FIG. 3, including a graph of received signal phase and a graph of output intensity of the optical resonator, according to various examples described herein.

Referring to FIG. 4A, illustrated is an example of the optical resonator 300 illustrated in FIG. 4A coupled to a pump source 450 that may be used to excite the active optical medium 324 of the optical resonator 300. In certain examples, the pump source 450 is an optical pump source 450 optically coupled to the active optical medium 324 and positioned to direct an optical pump beam 452 to the active optical medium 324. For instance, the pump source 450 may include a laser source optically coupled to the active optical medium 324 by free space, a waveguide, one or more optics, or a fiber coupling. The optical pump beam 452 may have one or more characteristics, such as a wavelength, that are tuned based on the properties of the received optical signal 310 and/or the properties of the active optical medium, as discussed above. For instance, a wavelength of the optical pump beam 452 may be selected to achieve a desired optical gain based on a wavelength of the received optical signal 310.

In some examples, the first-semi reflective surface 306 and second semi-reflective surface 308 may be at least partially reflective to the optical pump beam 452, and may reflect at least a portion of the optical pump beam 452 within the inside 304 of the optical resonator 300. Such an implementation would ensure a uniform illumination (e.g., excitation) of the active optical medium 324. However, in other examples, the pump source 450 may include an electrical power source electrically coupled to the active optical medium 324 and configured to electrically excite the active optical medium 324, for instance, by providing an electrical current or voltage. In such an example, the electrical power source may be electrically coupled to the active optical medium 324 by one or more electrical leads or cables.

As discussed herein, the optical resonator 300 coherently develops output optical signal energy 320 based on a received optical signal 310, and maintains a given level of the output optical signal energy 320 until a variation (e.g., a modulation in phase) of the received optical signal 310 occurs. In various examples, this given level of output optical signal energy 320 may have a higher intensity level (e.g., a larger amplitude) during the excitation of the active optical medium 324, relative to when the active optical medium 324 is not excited (i.e., no optical gain is provided).

When a phase modulation occurs in the received optical signal 310, destructive interference inside the optical resonator 300 causes a phase-dependent change in the amplitude of the output optical signal energy 320. This can be seen in the input phase plot 430 and the output power plot 440 illustrated in FIG. 4A. Accordingly, a received phase encoded optical communication signal, such as received optical signal 310, is converted to an amplitude varying signal, such as the output optical signal energy 320, by the optical resonator 300. The output optical signal energy 320 is suitable for direct detection by a sensor, such as the OEC 242 illustrated and described with reference to FIG. 2. Additionally, the optical resonator 300 will function over a broad range of data rates without the need to modify the optical characteristics of the system, such as detector setup, path length adjustments, delay elements, or the like. For example, the ability of the optical resonator 300 to convert an arriving phase modulated input optical signal 310 into an intensity modulated output optical signal energy 320 may be independent of the modulation rate at which the input phase is changing, in some examples.

FIG. 4A further illustrates operation of the optical resonator 300 with reference to the output power plot 440 of optical signal intensity (as output power) emerging from the optical resonator 300, during a phase transition 432 in the received optical signal 310. At point 442 the optical resonator 300 is in a steady-state resonance condition wherein a steady intensity of output optical signal energy 320 emerges. At point 444 a phase transition 432 occurs in the arriving optical signal 310, temporarily disrupting the steady-state and causing a change in the emerging light intensity of the output optical signal energy 320. During successive reflections inside the optical resonator 300 (e.g., accumulation of the resonating optical signal energy), labeled at point 446, resonance is being re-established and the emerging light intensity of the output optical signal energy increases until, at point 448, a steady intensity of light emerges when the optical resonator 300 has returned to a steady-state condition.

Accordingly, a disruption in the emerging light intensity of the output optical signal energy 320 from the optical resonator 300 indicates that a variation occurred in an arriving optical signal 310. As discussed, this variation may be a variation in a phase, frequency, or amplitude of the received optical signal 310. As such, the disruption in the output optical signal energy 320 may be used by appropriate signal processing components (e.g., a detector) to determine useful information by analyzing the emerging light intensity of the output optical signal energy 320. In the example discussed above and illustrated by FIG. 3, the arriving optical signal 310 is presumed to be phase modulated, but other examples include frequency or amplitude modulation, or any combination of these, and may cause similar variations or other detectable variations in output intensity. In some examples, higher order or more complex modulation may be accommodated by various optical resonator designs.

As a particular example, an optical resonator (e.g., an etalon) tuned to the wavelength of the received optical signal reacts to a phase variation in the optical signal in accord with the discussion above, and as illustrated in FIG. 3. If the arriving optical signal is modulated with binary phase shift keying (BPSK), for example, the output illustrated in FIG. 3 indicates each phase shift, and accordingly the information carried in the phase shift keying may be recovered from the intensity variations at the output optical signal energy 320. It should be understood by those of skill in the art with the benefit of this disclosure, that such information recovery is achieved without the necessity for a local coherent clock source to demodulate the arriving optical signal.

As shown in FIG. 4A, the output power plot 440 of output optical signal intensity (as output power) is representative of the output power when the active optical medium 324 is continuously driven (i.e., excited) by the pump source 450.

Figure 4B:
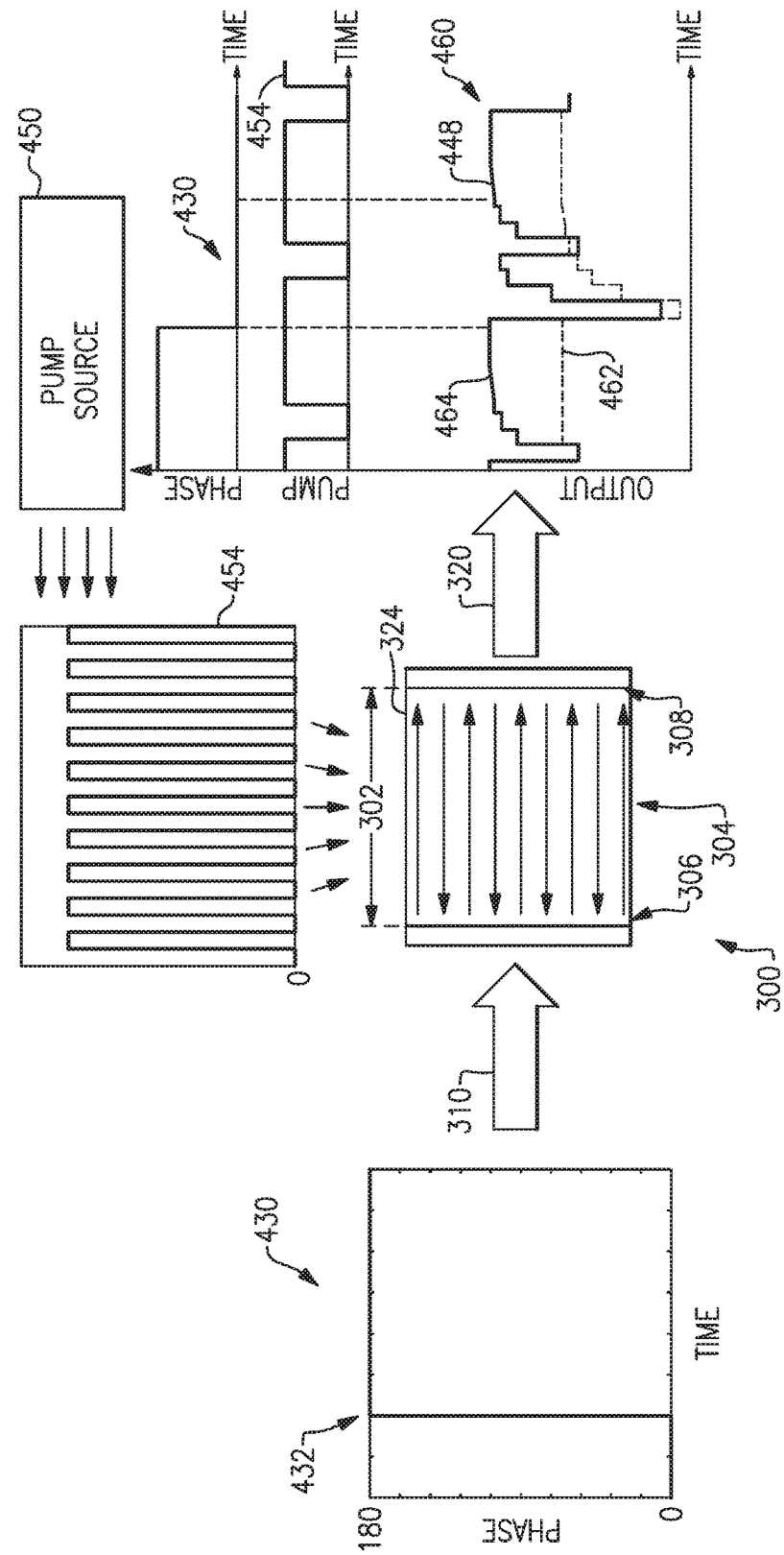
FIG. 4B is another schematic diagram of the optical resonator illustrated in FIG. 3, including a graph of received signal phase and a graph of output intensity of the optical resonator, according to various examples described herein.
Figure 4C:
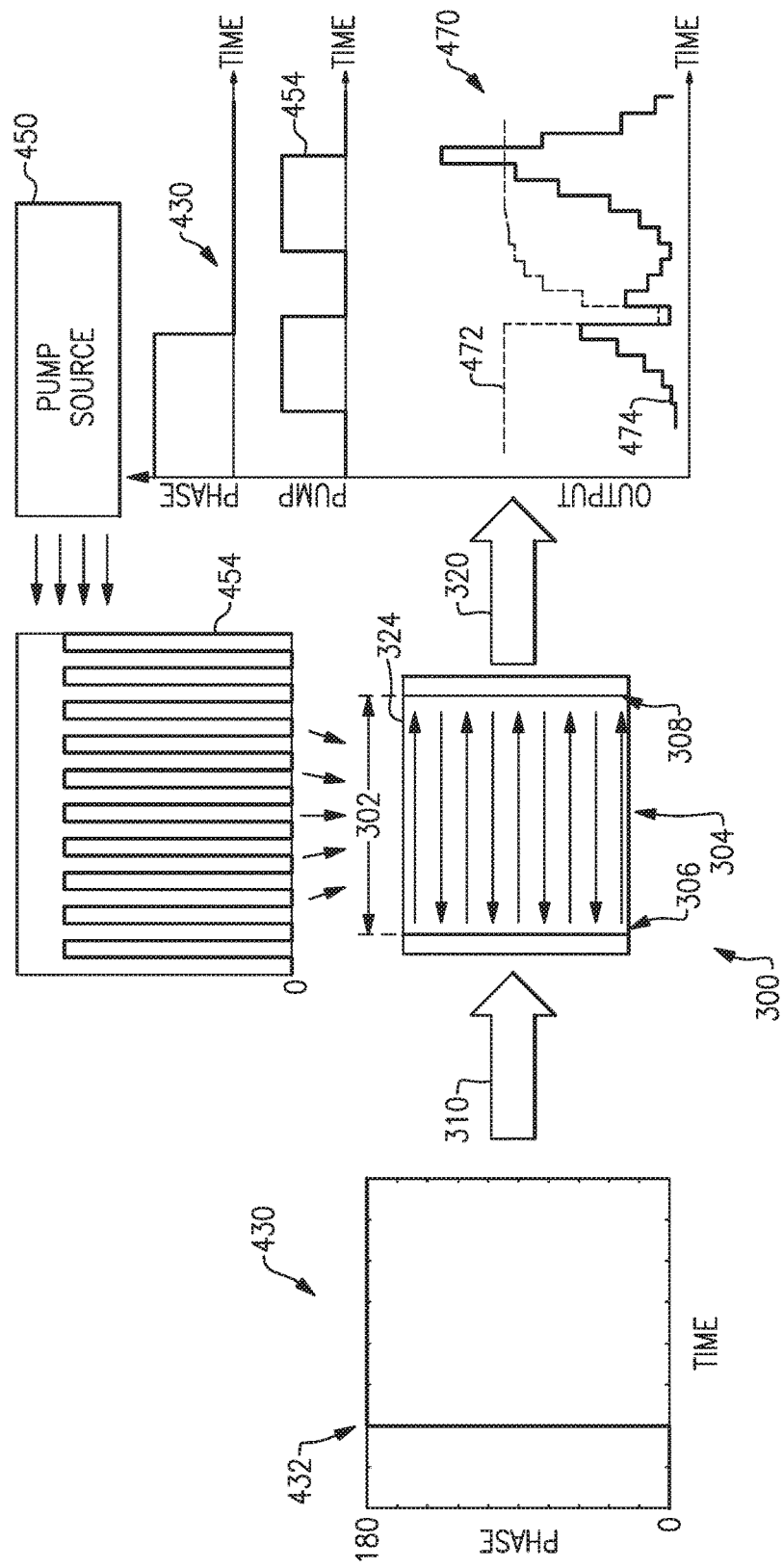
FIG. 4C is another schematic diagram of the optical resonator illustrated in FIG. 3, including a graph of received signal phase and a graph of output intensity of the optical resonator, according to various examples described herein.

However, as discussed herein, in various examples the active optical medium 324 may be selectively or dynamically controlled (i.e., selectively excited). For instance, in one example the pump source 450 may provide a pulsed pump beam to the active optical medium 324. In such an example, the pump source 450 may include an optical pump source, and the pulsed pump beam may be a pulsed optical pump beam. FIG. 4B and FIG. 4C illustrate examples of the pump source 450 illustrated in FIG. 4A providing a pulsed pump beam 454 to the active optical medium 329. Specifically, FIGS. 4B and 4C illustrate an example plot of the pulsed pump beam 454, where the pulsed pump beam 454 is an optical beam continuously pulsed between a substantially zero value and a predetermined target value at a constant rate of repetition. In addition to reducing the power consumption of the associated optical receiver, in various examples, the pulsed pump beam 454 may be synchronized with the received optical signal 310 such that a disturbance in the intensity of the output optical signal energy 320 (e.g., as a result of a phase change in the received optical signal 310) occurs coincident with a pulse of the pulsed pump beam 454. That is, the pulsed pump beam 454 may be synchronized with the received optical signal 310 such that a rising edge of a pulse of the pulsed pump beam 454 correlates with the accumulation of resonating optical signal energy within the optical signal resonator 300. Accordingly, in various examples, the output optical signal energy 320 is a convolution of the pulsed optical pump beam 454 and an emitted portion of the resonant optical signal energy. In various examples, the pulse rate of the pulsed pump beam 454 is on the order of the response time of the optical resonator 300.

The effect of this synchronization results in an increase in the "sharpness" of the return of the optical resonator to a steady-state resonance following the variation in the received optical signal 310. It is appreciated, that in various examples the active optical medium 324 may operate in more than one gain state based on the properties of the active optical medium 324, the received optical signal 310, and the pump beam (e.g., pulsed pump beam 454). For instance, the active optical medium 324 may operate in a low gain state when the optical gain is lower than the losses due to reflection coefficients and absorption within the active optical medium 324. In such an example, when the gain is low, and the optical signal 310 is constantly received and unchanging, the optical resonator 300 may reach the steady-state condition. One example of such an implementation is illustrated in FIG. 4B. In other examples, the active optical medium 324 may operate in a high gain state when the optical gain is larger than the losses due to reflection coefficients and absorption within the active optical medium. If the optical signal 310 is received at a resonant wavelength during such a condition, the optical resonator 300 may go into a lasing mode (e.g., the steady-state condition is not reached). Such an example is illustrated in FIG. 4C.

Referring to FIG. 4B, the output power plot 460 illustrates two traces of the output optical signal intensity (as output power). To illustrate the timing between the output power plot 460, the input phase plot 430, and the pulsed pump beam 454, the input phase plot 430 and the pulsed pump beam 454 are repeated on a shared timescale with the output power plot 460. The first trace 462 represents the output optical signal intensity when the optical gain medium 324 is not excited by the pump source 450. The second trace 464 represents the output optical signal intensity when the optical gain medium 324 is selectively excited by the pump source 450, e.g., via the described pulsed pump beam 454. As demonstrated by a comparison of the first trace 462 and second trace 464, the optical resonator 300 returns to the steady-state 448 faster and at a "sharper" transition when the active optical medium 324 is excited by the pulsed pump beam 454.

Referring to FIG. 4C, similar to FIG. 4B, illustrated is an output power plot 470 of two traces of the output optical signal intensity (as output power). To illustrate the timing between the output power plot 470, the input phase plot 430, and the pulsed pump beam 454, the input phase plot 430 and the pulsed pump beam 454 are repeated on a shared timescale with the output power plot 470. The first trace 472 represents the output optical signal intensity when the optical gain medium 324 is not excited by the pump source 450. The second trace 474 represents the output optical signal intensity when the optical gain medium 324 is selectively excited by the pump source 450, e.g., via the described pulsed pump beam 454.

Figure 5:
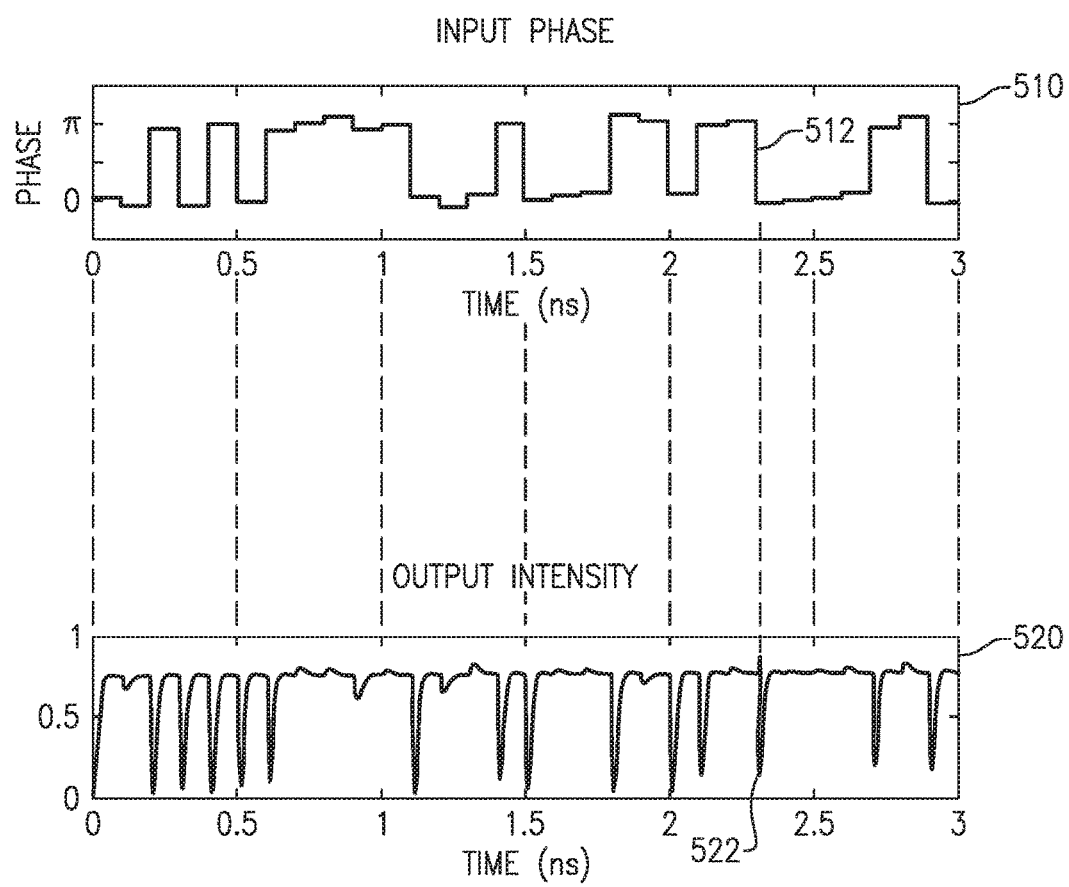
FIG. 5 is a graph of optical input phase and output intensity from an example of the optical resonator of FIG. 3.

FIG. 5 illustrates a plot 510 of varying phase of a received phase modulated optical signal, and a plot 520 of the resulting intensity of an output optical signal energy, from an optical resonator such as the optical resonator 300 illustrated in FIG. 3. The results shown in FIG. 5 are for an etalon having a length of 18 µm and with reflectance of 0.999 at the first semi-reflective surface and reflectance of 0.985 at the second semi-reflective surface. The otherwise continuous input phase (shown in the plot 510) changes at intervals according to the modulated information content, and the plot 510 can be seen as a sequence of binary data, such as high and low bits corresponding to ones and zeros, for example. Among the multiple phase transitions shown in the plot 510, a phase transition 512 is specifically associated with a change 522 in output intensity, shown in the plot 520. Each phase variation in the received optical signal causes a respective change in the intensity of the output optical signal energy. Accordingly, a receiver can track the changes in output intensity and thereby recover the information content of the received phase modulated optical signal.

Optical resonators, such as etalons, used to demodulate or convert optical signal modulations into intensity modulated output signals, as discussed herein, may be manufactured with significant aperture area to receive light signals, and may receive and operate on received light across a large aperture, such that portions of the light in one region of the aperture area may have varying phase relationship to other portions of the light received at other regions of the aperture area. The portions of light received at various regions may be operated on by the etalon essentially independently of each other. Light received at a first region of the etalon's aperture may be converted to intensity variations at an associated first output region, and light received at a second region of the aperture may be independently converted to intensity variations at an associated second output region, without interaction of the relative phases of the light arriving at each region. Accordingly, wavefront correction may not be required. Phase or other variations in any number of differing regions of the etalon's aperture may be simultaneously detected and converted into output intensity modulations at each of a respective output region. Such may be beneficial when the optical signal arriving at a receiver has propagated through a medium that causes wavefront variation.

Figure 6:
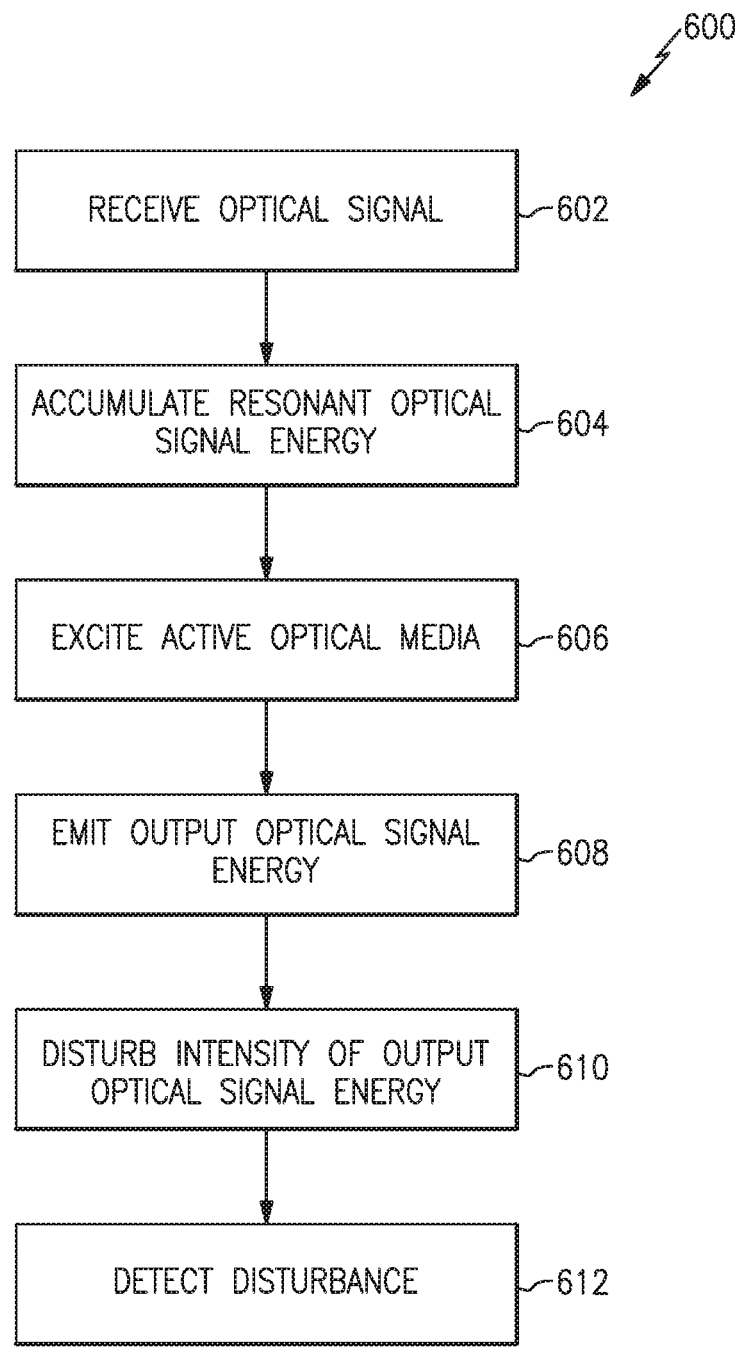
FIG. 6 is a process flow of a method for operating an optical signal receiver, according to various examples described herein.

As discussed above, various examples perform processes that improve known techniques for demodulating a phase-encoded optical signal. In some examples, these processes are executed by an optical receiver, such as the optical receiver 200 described above with reference to FIG. 2. In particular examples, the optical receiver may include an optical resonator, such as the optical resonator 300 described with reference to FIG. 3. One example of a process for operating an optical receiver, such as the optical receiver illustrated in FIG. 2, is illustrated in FIG. 6. FIG. 6 is described with continuing reference to the optical resonator 300 illustrated in FIG. 3. In various examples, the process 600 may include receiving an optical signal, accumulating resonant optical signal energy, exciting an active optical medium to generate an optical gain, emitting output optical signal energy, disturbing an intensity of the output optical signal energy, and detecting the disturbance.

In act 602, the process 600 may include receiving an optical signal at the first semi-reflective surface 306 of the optical resonator 300. For instance, the optical receiver may receive an optical signal transmitted along a free space signal path (e.g., free space optical, FSO), a fiber coupling, or another waveguide system by the optical transmitter 100 of FIG. 1. As described herein, in some examples, the surfaces 306, 308 of the optical resonator 300 are semi-reflective and also semi-transmissive. Accordingly, in some examples, act 602 includes directing the received optical signal 210 into the optical resonator 300 (i.e., between the pair of semi-reflective surfaces 306, 308) with the first semi-reflective surface 306.

In act 604, the process 600 may include accumulating resonant optical signal energy at the active optical medium 324 interposed between the first semi-reflective surface 306 and the second semi-reflective surface 308 of the optical resonator 300. That is, in various examples, the arriving optical signal allowed into the optical resonator 300 (i.e., between the pair of semi-reflective surfaces 306, 308) may resonate inside the optical resonator 300 and between the pair of semi-reflective surfaces 306, 308. As such, in act 604 the optical signal received by the optical resonator 300 may establish a steady-state energy-preserving condition in which optical signal continuously arrives at the optical resonator 300 and accumulates or adds to build-up resonating optical signal energy inside the optical resonator 300.

In act 606, the process 600 may include exciting the active optical medium 324 to generate an optical gain in the received optical signal. As discussed, the active optical medium 324 may include one or more active material layers that, when excited, amplify the received optical signal, and accordingly, amplify the resonating optical signal energy inside the optical resonator 300 and the output optical signal energy. In act 606, the process 600 may include generating a pump beam at an optical source and directing the pump beam at the active optical medium 324. While in one example, the active optical medium 324 may be excited by an optical pump source, such as a laser source, in other examples the active optical medium 324 may be responsive to other forms of excitation, such as an electrical current, an electrical voltage, or a mechanical excitation (e.g., e.g., displacement). Accordingly, in various other examples, act 606 may include generating a voltage or current at an electrical power source, and delivering the voltage or current to the active optical medium 324.

In act 608, the process 600 may include emitting output optical signal energy from the second semi-reflective surface 308, an intensity of the output optical signal energy being based at least in part on an intensity of the accumulated resonant optical signal energy. That is, in various examples, at least a portion of the accumulated resonating optical signal energy inside the optical resonator 300 may be emitted from the optical resonator 300 at a constant rate (i.e., a steady-state output value). A variation in the arriving phase, frequency, or amplitude of the optical signal may disrupt the optical signal energy resonating inside the optical resonator 300, and, accordingly, disturb the output optical signal energy. As such, in act 610, the process 600 may include disturbing the intensity of the output optical signal energy in response to a variation in the received optical signal.

Referring to act 610, a change in phase, frequency, or amplitude of the arriving optical signal causes a change in intensity of the emerging output optical signal energy. A large phase transition in the arriving optical signal, for example, causes a large (but temporary) intensity change in the emerging output optical signal energy. As such, in act 612, the process 600 may include detecting the disturbance in the intensity of the output optical signal energy. Such actions may be performed by a detector, such as a detector that includes an OEC, an analog to digital converter, and a digital processing subsystem. Specifically, the detector may process the disturbance in the intensity of the output optical signal energy to receive the information-carrying content of the optical signal. Accordingly, the optical resonator 300 functions as a demodulator, or a modulation converter, for a received optical signal. That is, the emerging output optical signal energy may therefore carry the same information content as the arriving optical signal, but in intensity modulated form.

While not explicitly illustrated or described with reference to the process flow illustrated in FIG. 6, in various examples the process 600 may include additional acts or sub-acts. Such acts and sub-acts are described herein with reference to at least FIGS. 2, 3, 4A, 4B, 4C, and 5.

Certain embodiments may incorporate various additional aspects or components to further provide selectivity of one light signal over another. For example, light of certain wavelengths may be preferred or rejected through the use of frequency selective filters, frequency selective coatings, and/or by selection of frequency selective dimensions or other features of an optical resonator or other resonant structures.

As discussed above with reference to at least FIGS. 1 and 2, in various examples components of the optical transmitter 100 and/or optical receiver 200 may be implemented as one of, or a combination of, analog circuitry, digital circuitry, or one or more digital signal processors (DSP) or other microprocessors executing software instructions. Software instructions may include DSP instructions. Various aspects and functions described herein may be implemented as specialized hardware or software components executing in one or more computer systems.

Figure 7:
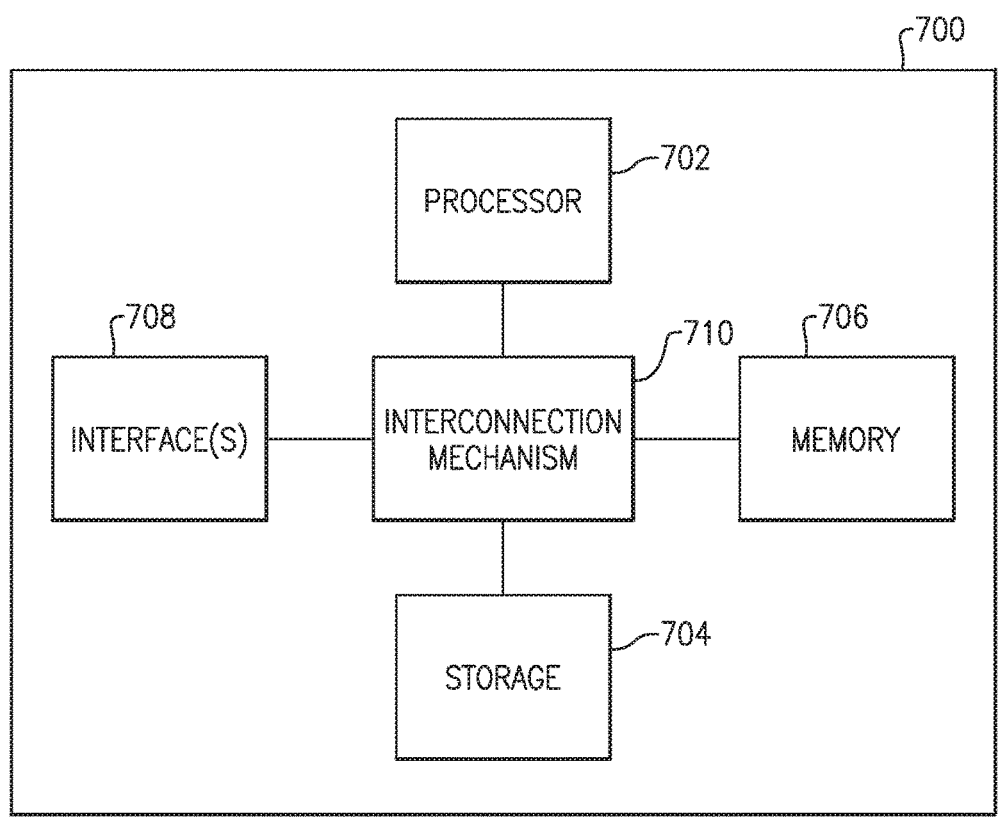
FIG. 7 is a functional block diagram of an example of a computing system that may be configured to implement various examples of the processes described herein.

FIG. 7 illustrates one example of a computing system 700 that may implement software routines corresponding to a control circuit or module, the FEC module 104, the spreading module 106, the mapping module 108, as illustrated in FIG. 1, and/or other components. The computing system 700 may further implement software routines corresponding to the correlator 252 and/or the code generator 254 associated with the digital processing subsystem 250 of FIG. 2 and/or other components of a receiver 200. The computing system 700 may include a processor 702, data storage 704, a memory 706, and one or more interfaces 708, such as a system interface and/or a user interface. While not explicitly illustrated in FIG. 7, in certain examples the computing system 700 may be coupled to a power source. The power source may deliver power to one or more components of the computing system 700, as well as other components of the optical transmitter 100 or optical receiver 200.

In FIG. 7, the processor 702 is coupled to the data storage 704, memory 706, and the various interfaces 708. The memory 706 stores programs (e.g., sequences of instructions coded to be executable by the processor 702) and data during operation of the computing system 700. Thus, the memory 706 may be a relatively high performance, volatile, random access memory such as a dynamic random access memory ("DRAM") or static memory ("SRAM"). However, the memory 706 may include any device for storing data, such as a disk drive or other nonvolatile storage device. Various examples may organize the memory 706 into particularized and, in some cases, unique structures to perform the functions disclosed herein. These data structures may be sized and organized to store values for particular data and types of data.

The data storage 704 includes a computer readable and writeable data storage medium configured to store non-transitory instructions and other data, and can include non-volatile storage medium, such as optical or magnetic disk, ROM or flash memory. The instructions may include executable programs or other code that can be executed by the at least one processor 702 to perform any of the functions described herein.

In various examples, the computing system 700 includes several interface components 708, such as a system interface and/or a user interface. Each of the interface components 708 is configured to exchange, e.g., send or receive, data with other components of the computing system 700 (and/or associated transmitter or receiver), or other devices in communication with the computing system 700. According to various examples, the interface components 708 may include hardware components, software components, or a combination of hardware and software components.

In certain examples, components of the system interface couples the processor 702 to one or more other components of the optical transmitter 100 shown in FIG. 1, or of the optical receiver 200 shown in FIG. 2. The system interface may provide one or more control signals to any such components and may manage the operation of such components, as described above.

A user interface may include hardware and/or software components that allow a corresponding transmitter or receiver in which the computing system 700 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the computing system 700. Data received at the various interfaces may be provided to the processor 702, as illustrated in FIG. 7. Communication coupling (e.g., shown interconnection mechanism 710) between the processor 702, memory 706, data storage 704, and interface(s) 708 may be implemented as one or more physical busses in conformance with standard, proprietary, or specialized computing bus technologies.

The processor 702 performs a series of instructions that result in manipulated data that is stored in and retrieved from the data storage 704, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 702 may be any type of processor, multi-processor or controller, whether commercially available or specially manufactured. For instance, the processor may include a commercially available processor, such as a processor manufactured by INTEL, AMD, MOTOROLA, or FREESCALE. In some examples, the processor 702 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
an optical resonator configured to receive an optical signal, the optical resonator including a first semi-reflective surface positioned to receive the optical signal, a second semi-reflective surface positioned facing the first semi-reflective surface, and an active optical medium interposed between the first and second semi-reflective surfaces and configured to accumulate resonant optical signal energy inside the optical resonator based at least in part on the received optical signal, and the optical resonator being further configured to emit output optical signal energy via the second semi-reflective surface, wherein the optical resonator is configured to cause a variation in an intensity of the output optical signal energy in response to a variation in a phase of the received optical signal; and
a detector configured to detect the variation in the intensity of the output optical signal energy and to identify the variation in the phase of the received optical signal based at least in part on the variation in the intensity of the output optical signal energy; and
a pump source coupled to the active optical medium and configured to excite the active optical medium to generate an optical gain in the received optical signal.

2. The optical signal receiver of claim 1, wherein the pump source is an optical source optically coupled to the active optical medium and configured to direct a pump beam at the active optical medium.

3. The optical signal receiver of claim 2, wherein the output optical signal energy is a convolution of the pump beam and an emitted portion of the accumulated resonant optical signal energy.

4. The optical signal receiver of claim 3, wherein the pump beam is a pulsed pump beam.

5. The optical signal receiver of claim 3, wherein the pump beam is a continuous pump beam.

6. The optical signal receiver of claim 3, wherein the active optical medium has an absorption band, the pump beam having a wavelength tuned to the absorption band of the active optical medium.

7. The optical signal receiver of claim 1, wherein the pump source is configured to direct a pulsed pump beam at the active optical medium, the pulsed pump beam being synchronized with the received optical signal such that the variation in the intensity of the output optical signal energy occurs coincident with a pulse of the pulsed pump beam.

8. The optical signal receiver of claim 1, wherein the pump source is an electrical power source coupled to the active optical medium and configured to electrically excite the active optical medium.

9. The optical signal receiver of claim 1, wherein the optical resonator is further configured to accumulate the resonant optical signal energy inside the optical resonator and between the first semi-reflective surface and the second semi-reflective surface to approach a steady-state output value of the output optical signal energy, the variation in the intensity of the output optical signal energy being a deviation from the steady-state output value.

10. A method of operating an optical signal receiver, the method comprising:
receiving an optical signal at an optical resonator, the optical resonator including an active optical medium;
exciting the active optical medium to generate an optical gain in the received optical signal by generating a pulsed pump beam with an optical pump source and directing the pulsed pump beam at the active optical medium;
accumulating resonant optical signal energy in the active optical medium based at least in part on the received optical signal;
emitting output optical signal energy from the optical resonator, an intensity of the output optical signal energy being based at least in part on an intensity of the accumulated resonant optical signal energy;
disturbing the intensity of the output optical signal energy in response to a variation in a phase of the received optical signal; and
detecting the disturbance in the intensity of the output optical signal energy,
wherein the pulsed pump beam is synchronized with the received optical signal such that the disturbance in the intensity of the output optical signal energy occurs coincident with a pulse of the pulsed pump beam.

11. The method of claim 10, wherein the output optical signal energy is a convolution of the pulsed pump beam and an emitted portion of the accumulated resonant optical signal energy.

12. The method of claim 10, further comprising identifying the variation in the phase of the received optical signal based at least in part on the disturbance in the intensity of the output optical signal energy.

13. An optical signal receiver comprising:
an optical resonator configured to receive an optical signal, the optical resonator including an active optical medium configured to accumulate resonant optical signal energy inside the optical resonator based at least in part on the received optical signal, and the optical resonator being further configured to emit output optical signal energy, wherein the optical resonator is configured to cause a variation in an intensity of the output optical signal energy in response to a variation in a phase of the received optical signal;
a detector configured to detect the variation in the intensity of the output optical signal energy and to identify the variation in the phase of the received optical signal based at least in part on the variation in the intensity of the output optical signal energy; and
a pump source coupled to the active optical medium and configured to direct a pulsed pump beam at the active optical medium to excite the active optical medium to generate an optical gain in the received optical signal, the pulsed pump beam being synchronized with the received optical signal such that the variation in the intensity of the output optical signal energy occurs coincident with a pulse of the pulsed pump beam.

14. The optical signal receiver of claim 13, wherein the output optical signal energy is a convolution of the pulsed pump beam and an emitted portion of the accumulated resonant optical signal energy.

15. The optical signal receiver of claim 13, wherein the active optical medium has an absorption band, the pulsed pump beam having a wavelength tuned to the absorption band of the active optical medium.

16. The optical signal receiver of claim 13, wherein the optical resonator further includes:
a first semi-reflective surface positioned to receive the optical signal; and
a second semi-reflective surface positioned facing the first semi-reflective surface and arranged to emit the output optical signal energy;
wherein the active optical medium is interposed between the first semi-reflective surface and the second semi-reflective surface and the optical resonator is configured to accumulate the resonant optical signal energy inside the optical resonator and between the first semi-reflective surface and the second semi-reflective surface to approach a steady-state output value of the output optical signal energy, the variation in the intensity of the output optical signal energy being a deviation from the steady-state output value.

17. An optical signal receiver comprising:
an optical resonator configured to receive an optical signal, the optical resonator including an active optical medium having an absorption band and configured to accumulate resonant optical signal energy inside the optical resonator based at least in part on the received optical signal, and the optical resonator being further configured to emit output optical signal energy, wherein the optical resonator is configured to cause a variation in an intensity of the output optical signal energy in response to a variation in a phase of the received optical signal;
a detector configured to detect the variation in the intensity of the output optical signal energy and to identify the variation in the phase of the received optical signal based at least in part on the variation in the intensity of the output optical signal energy; and
an optical pump source coupled to the active optical medium and configured to direct a pump beam at the active optical medium to excite the active optical medium to generate an optical gain in the received optical signal, the pump beam having a wavelength tuned to the absorption band of the active optical medium.

18. The optical signal receiver of claim 17, wherein the optical resonator further includes:
a first semi-reflective surface positioned to receive the optical signal; and a second semi-reflective surface positioned facing the first semi-reflective surface and arranged to emit the output optical signal energy;

wherein the active optical medium is interposed between the first semi-reflective surface and the second semi-reflective surface and the optical resonator is configured to accumulate the resonant optical signal energy inside the optical resonator between the first semi-reflective surface and the second semi-reflective surface to approach a steady-state output value of the output optical signal energy, the variation in the intensity of the output optical signal energy being a deviation from the steady-state output value.

19. The optical signal receiver of claim 18, wherein the pump beam is a pulsed pump beam, the pulsed pump beam being synchronized with the received optical signal such that the variation in the intensity of the output optical signal energy occurs coincident with a pulse of the pulsed pump beam.

* * * * *